(12) United States Patent
Desai et al.

(10) Patent No.: US 7,204,416 B1
(45) Date of Patent: *Apr. 17, 2007

(54) SYSTEM AND METHOD FOR UNCONTROLLED VELOCITY SCANNING

(75) Inventors: Manish J. Desai, Houston, TX (US); Mohammad Husain, Humble, TX (US); Jonathan E. Andersson, Round Rock, TX (US)

(73) Assignee: Commerciant, LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/953,630

(22) Filed: Sep. 29, 2004

Related U.S. Application Data (63) Continuation of application No. 10/094,873, filed on Mar. 7, 2002, now Pat. No. 6,851,608.

(51) Int. Cl.
G06K 7/10 (2006.01)
G06K 7/14 (2006.01)
G06K 7/08 (2006.01)

(52) U.S. Cl. ................. 235/454; 235/449; 235/472.03; 382/139; 382/140

(58) Field of Classification Search ................ 235/449, 235/454, 450, 462.01, 462.13, 470, 482, 235/462.49, 472.03, 462.29; 382/137, 139, 382/140, 275; 705/45; 358/3.26; 348/249
See application file for complete search history.

(56) References Cited

U.S. PATENT DOCUMENTS

| | | | | | |
|---|---|---|---|---|---|
| 3,988,688 | A | * | 10/1976 | Wu | 341/50 |
| 4,260,880 | A | * | 4/1981 | Thomas | 235/454 |
| 4,315,246 | A | * | 2/1982 | Milford | 382/140 |
| 4,396,902 | A | | 8/1983 | Warthan et al. | 382/137 |
| 4,703,186 | A | * | 10/1987 | Nakayama et al. | 235/462.45 |
| 4,776,021 | A | * | 10/1988 | Ho | 382/139 |
| 5,054,092 | A | * | 10/1991 | LaCaze | 382/139 |
| 5,121,437 | A | * | 6/1992 | Mazumder | 382/139 |
| 5,334,824 | A | | 8/1994 | Martinez | |
| 5,345,090 | A | * | 9/1994 | Hludzinski | 235/482 |
| 5,432,329 | A | * | 7/1995 | O'Boyle et al. | 235/454 |
| 5,484,988 | A | | 1/1996 | Hills et al. | |
| 5,524,063 | A | * | 6/1996 | Henrot | 382/139 |
| 5,691,773 | A | * | 11/1997 | Wang et al. | 348/249 |
| 5,740,271 | A | * | 4/1998 | Kunkler et al. | 382/137 |
| 5,760,961 | A | * | 6/1998 | Tompkin et al. | 359/576 |
| 6,164,528 | A | | 12/2000 | Hills et al. | |
| 6,283,366 | B1 | | 9/2001 | Hills et al. | |
| 6,327,378 | B1 | * | 12/2001 | Ball | 382/137 |

(Continued)

FOREIGN PATENT DOCUMENTS

JP 61-110371 A * 5/1986

*Primary Examiner*—Jared J. Fureman
(74) *Attorney, Agent, or Firm*—Fulbright & Jaworski LLP (57) ABSTRACT

Disclosed are systems and methods which provide for scanning of information, such as characters or symbols, without requiring a controlled scan velocity. Preferred embodiments utilize an optical sensor in detecting attributes of information scanned and implement compensation techniques to remediate the effects of distortion and present information which may be identified to a high level of confidence. A known topology may be relied upon to present known markers in the scanned information, such as known blank or filled regions, patterns, or other observable traits and utilized with respect to a distorted scanned image to compensate for the effects of the distortion. Additionally or alternatively, vector based pattern recognition may be utilized in remediating distortion of a scanned image.

37 Claims, 4 Drawing Sheets

U.S. PATENT DOCUMENTS

| | | | |
|---|---|---|---|
| 6,659,347 B1 * | 12/2003 | Moore et al. | 235/449 |
| 6,758,399 B1 * | 7/2004 | Brunelli et al. | 235/462.01 |
| 6,825,919 B2 * | 11/2004 | Beimers et al. | 235/462.13 |
| 6,851,608 B1 * | 2/2005 | Desai et al. | 235/449 |
| 6,944,227 B1 * | 9/2005 | Bober | 375/240.22 |
| 2002/0044681 A1 * | 4/2002 | Fujimoto et al. | 382/275 |
| 2005/0160039 A1 * | 7/2005 | Garner et al. | 705/45 |

* cited by examiner

SYSTEM AND METHOD FOR UNCONTROLLED VELOCITY SCANNING

This application is a continuation of U.S. application Ser. No. 10/094,873, filed on Mar. 7, 2002, now U.S. Pat. No. 6,851,608, the full disclosures of which are incorporated herein by reference.

TECHNICAL FIELD

The invention is related generally to scanning information and, more particularly, to providing for accurate scanning of characters, symbols, or other information without controlling scan velocity.

BACKGROUND OF THE INVENTION

It is not uncommon today to provide for scanning of information for use in electronic data processing. For example, since the 1950s banks have used Magnetic Ink Character Recognition (MICR) in automating the sorting of checks based upon information contained thereon, such as issuing bank and/or account information. For example, the E-13B MICR character set has been adopted as a standard to facilitate the clearing of checks in commerce in the United States through scanning of information printed thereon in that character set. Similarly, the CMC-7 MICR character set has been adopted for use in some parts of Europe and Asia.

Scanning equipment utilized in scanning MICR codes, such as the aforementioned E-13B and CMC-7 MICR character sets, has traditionally been costly and relatively bulky. For example, banks have typically implemented a magnetic and analog system that passes a check in front of a sensor to sample and amplify the magnetic field associated with MICR characters imprinted thereon. The system would determine which character is then being read by judging characteristics of the associated magnetic field.

Although such systems are desirable because they allow for high speed scanning of a large volume of checks, the scanning technology has typically required significant shielding and document feeding apparatus. For example, shielding is required to avoid the electromagnetic emissions in the environment, such as from other electronic equipment or even from components of the scanner equipment itself, from interfering in the sampling of MICR character magnetic fields. Generally, a significant amount of metal, such as disposed to form an electromagnetic shield around a sensor cavity, is provided in the scanning apparatus to prevent the leaking of electromagnetic interference. Such shielding not only adds to the weight of the system, but it also adds to the cost of an already extremely complex system.

Moreover, scanners implemented in providing high speed scanning of checks have typically required very precise control of the scanning velocity, e.g., the rate at which a check is passed by a sensor, in order to accurately sample the relatively small magnetic field associated with the MICR characters. Accordingly, scanning systems capable of reading MICR characters have utilized a controlled feed path in which checks, or other documents having information to be scanned, are gripped by a motorized feed mechanism, such as a rubber nip roller coupled to a motor rotating at a controlled and constant velocity, to transport the characters across a sensing area at a known and constant rate.

Advances in optical scanning have allowed the use of optical sensors, such as to take snapshots of a check being scanned, in place of the aforementioned magnetic sensors. However, such alternative scanning sensing apparatuses continue to be plagued with problems, such as the aforementioned problem of requiring a controlled scan velocity to facilitate accurate scanning of information. For example, the optical image of the scanned characters will be distorted as a function of the scan velocity. Accordingly, a controlled scan velocity, such as is provided using the aforementioned motorized feed mechanism, is utilized to provide a controlled scan velocity.

However, it is not uncommon today for the situation in which scanning is to be accomplished to present challenges both with respect to the size of scanning equipment and the cost of the scanning equipment to be utilized. For example, it is common today to scan information with respect to a patron making a purchase at a point of sale (POS). According to a common scenario, a patron tenders a credit card having a magnetic stripe thereon for scanning of the patron's credit account information and authorize a bank to issue payment for the purchase being made. Accordingly, a patron's credit card is typically passed through a slot having a magnetic stripe reader head disposed therein for reading information encoded on the card's magnetic stripe.

Generally, the POS environment presents a limited amount of space available for deploying scanning equipment. Moreover, POS terminals are typically deployed in relatively large numbers, such as to provide a large number of checkout positions in a store and/or to provide a large number of individual store locations.

Magnetic stripe readers have been developed which require relatively little space and which are relatively inexpensive, such as may be embodied as a slot with magnetic read head in a computer keyboard or POS terminal. Unfortunately, the smallest MICR scanners available today for use as POS check readers are relatively large and expensive as compared to the magnetic stripe readers. Specifically, POS check readers typically continue to employ shielding as described above. Moreover, precisely controlled feed path mechanisms, such as in the form of a rubber nip roller driven by a stepper motor assembly, are included to provide a controlled and constant scan velocity.

For example, a POS check reader configuration in common use today provides a "horseshoe" or U shaped check feed slot having knurled rubber roller connected to a motor disposed therein. As a check is inserted into the feed slot, the roller, rotating at a controlled velocity associated with the operation of the motor, engages the check and feeds the check across the sensor at a constant velocity. The use of such a controlled feed mechanism has been found not to be conducive either to a relatively small implementation or to providing a relatively inexpensive unit which may economically be deployed in large numbers.

Accordingly, a need exists in the art for systems and methods providing for scanning of information, such as characters or symbols, which are relatively small and inexpensive. A need exists in the art for such scanning systems and methods to provide reliable scanning without requiring a controlled scan velocity.

SUMMARY OF THE INVENTION

The present invention is directed to systems and methods which provide for scanning of information, such as characters or symbols, without requiring a controlled scan velocity. Accordingly, the present invention may be implemented without controlled feed mechanisms, such as a feed roller and motor assembly. For example, a preferred embodiment of the present invention may be deployed in a relatively small and inexpensive device, such as may be economically deployed at a POS and/or which may be transported for use in the field, for use in scanning MICR characters on a check or other document. Embodiments of the present invention are provided in a POS terminal package substantially corresponding to credit card POS terminal in use today. Other embodiments of the present invention are provided in hand held devices, such as may be provided with wireless communication links, approximately the size of a personal digital assistant (PDA) or cell phone.

Preferred embodiments of the present invention utilize an optical sensor in detecting attributes of information scanned. However, as the scan velocity is not controlled according to preferred embodiments of the present invention, the scanned images will likely include substantial and/or unpredictable distortion. Accordingly, preferred embodiments of the present invention implement compensation techniques to remediate the effects of distortion and present information which may be identified to a high level of confidence.

Preferably, such compensation techniques are not only provided with respect to distortion associated with uncontrolled scan velocity along a X axis (e.g., scan feed rate), but are also provided with respect to changes in velocity or uncontrolled movement along a Y axis (e.g., scan feed jitter). Moreover, preferred embodiments of the invention provide compensation techniques adapted to address changes in velocity or uncontrolled movement experienced along a Z axis (e.g., scan feed yaw). According to a preferred embodiment, compensation for distortion associated with changes in scan velocity is provided through the use of algorithmic approaches, such as may be executed upon microprocessor devices.

Accordingly, embodiments of the invention may be disposed in relatively small, even portable, devices having a slot for passing a document to be scanned over an optical sensor. The optical sensor is preferably coupled to a microprocessor circuit to implement distortion compensation algorithms according to the present invention. A most preferred embodiment of the present invention may be configured to be included in a device having a magnetic stripe reader. For example, the present invention may utilize the same slot used for guiding a credit card over a magnetic sensor, without requiring significant alteration in the size, weight, or even cost of such a device. Such embodiments provide the ability to scan MICR codes found upon checks, in addition to the ability to read information from a credit card magnetic stripe, using inexpensive portable devices which may be deployed almost ubiquitously.

It should be appreciated that in order to implement automatic clearing house (ACH) transactions, it is generally required that the input of account information be automated to minimize the possibility for an error in which funds are deducted from an incorrect account. Accordingly, in order to provide conversion of a check tendered at a POS to an ACH transaction for electronic funds transfer (EFT), automated scanning of the account numbers appearing in MICR code at the bottom of the check is generally required. Preferred embodiments of the present invention are well suited for use in such situations as a relatively small and inexpensive device may be deployed to provide accurate and reliable scanning of MICR code account information.

Moreover, because embodiments of the present invention do not utilize bulky and complicated feed mechanisms associated with controlled scan velocity implementations, the present invention may be utilized to provide portable, even handheld, terminals which may be used in the field, such as by delivery persons and the like. Accordingly, preferred embodiments of the present invention provide a handheld device in a robust, industrially designed, package suitable for portable use.

Although preferred embodiments of the invention have been discussed above with respect to scanning of MICR codes, the present invention may be utilized in scanning a variety of information, characters, symbols, and the like. Preferred embodiments of the invention may be utilized in scanning any known topology, utilizing that topology to normalize the data and filter scan distortion. For example, a known topology may be relied upon to present known markers in the scanned information, such as known blank or filled regions, patterns, or other observable traits. Information with respect to such a known topology is preferably utilized with respect to a distorted scanned image to compensate for the effects of the distortion.

Preferred embodiments of the present invention utilize aspects of a known topology to normalize portions of a scanned image and, thereby, mitigate the effects of distortion. For example, symbols in a scanned MICR code may be normalized through algorithms of the present invention recognizing white spaces and normalizing information therebetween. Similarly, a bar code may be scanned according to the present invention by detecting filled regions and blank regions. A bar may be presumed to continue until a blank region is detected to indicate the progression past a particular bar in the code. The size of blank regions detected may be utilized in normalizing corresponding ones of the filled regions and, therefore, normalization of the bars of the code.

Embodiments of the present invention may utilize scan velocity feedback information for remediate distortion associated with uncontrolled velocity scanning. For example, a scan velocity clock signal, such as provided by a wheel encoder which interfaces with a scanned document, may be provided for use in normalizing portions of a scanned image. Timing pulses provided by such a wheel encoder may be utilized with respect to the scanned image to remediate distortion thereof.

Additionally or alternatively, embodiments of the present invention may utilize vector based pattern recognition in remediating distortion of a scanned image. For example, scan velocity distortion associated with uncontrolled scan feed rate (X axis velocity) may be remediated using either or both of the above mentioned topology based and velocity feedback techniques, while leaving an appreciable amount of distortion unremediated, such as associated with scan feed jitter (Y axis movement) and/or scan feed yaw (Z axis movement). Accordingly, preferred embodiments of the present invention implement vector based decision making to filter the effects of scan feed jitter and/or scan feed yaw from normalized portions of a scanned image.

Embodiments of the present invention may utilize mechanical means for minimizing scan distortion. For example, mechanical systems providing viscous resistance or viscous friction may be utilized to minimize distortion associated with an uncontrolled scan velocity. For example, embodiments of the present invention may dispose a member, such as comprised of a rubber surface having a resistive force applied thereto, in a media scanning path. The member may be configured to offer more resistance as the media is drawn through the path at a higher speed to thereby minimize the amount of distortion associated with the scan thereof.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Preferred embodiments of the present invention provide a scanning device for use in automated or electronic transactions which may be readily deployed at a point of sale (POS) and/or which may be handheld for portable use. For example, a preferred embodiment of the present invention provides a scanning device adapted to scan magnetic ink character recognition (MICR) codes presenting account information on a check for use in implementing automatic clearing house (ACH) transactions. Accordingly, an inexpensive MICR code scanner of the present invention may be utilized for conversion of a check for electronic funds transfer (EFT) by a delivery person, if desired.

It should be appreciated that POS devices are presently available which provide for scanning of MICR codes provided upon a check. However, such scanning devices are typically relatively large and expensive. For example, current MICR code scanning devices require a controlled scan velocity in order to reliably and accurately recognize scanned characters. Moreover, such scanning devices often employ substantial electromagnetic shielding to facilitate the proper recognition of a magnetic field associated with a MICR character.

Relatively small and inexpensive devices have been developed for use in POS transactions using credit and debit cards having magnetic stripes disposed thereon. For example, credit card terminals having a small, usually one line, character display, a numeric key pad, and a slot or channel having a magnetic read head disposed therein have been used for conducting transactions at the point of sale using credit and debit cards for a number of years. More recently, systems such as personal computers have been adapted for use in conducting transactions using credit and debit cards by providing a slot or channel having a magnetic read head disposed therein, such as in a keyboard thereof or as a peripheral device thereto, and providing the appropriate software to interact with the magnetic stripe reader.

Figure 1:
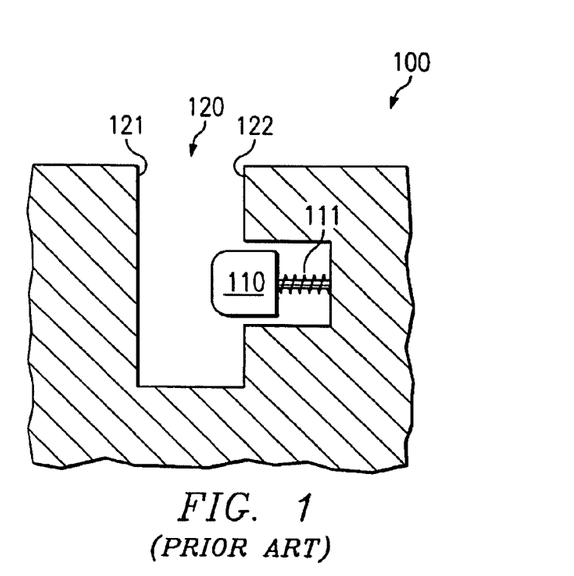
FIG. 1 shows a cross section view of a typical prior art magnetic scanner slot.

Directing attention to FIG. 1, a cross section view of a prior art device with a slot or channel having a magnetic read head disposed therein is shown generally as magnetic stripe reader 100. Specifically, magnetic stripe reader 100 includes slot 120, defined at least in part by walls 121 and 122, having magnetic read head 110 disposed therein. Magnetic read head 110 is oriented in wall 122 to interface with a magnetic stripe of a credit or debit card drawn through slot 120. In order to maintain contact between magnetic read head 110 and the magnetic stripe (not shown) of a credit or debit card when the credit or debit card is drawn through slot 120, magnetic read head is provided with a bias force, such as by bias spring 111. Magnetic read head 110 would likely be coupled to a processor based system which would utilize information read from the magnetic stripe of the credit or debit card to conduct a transaction, such as to initiate an electronic funds transfer of a sales amount.

Scanning devices of the present invention may be disposed in relatively small, even portable, devices having a slot or other feature for passing a document to be scanned over an optical sensor. Accordingly, an embodiment of the present invention may be adapted for use with a POS terminal, such as the aforementioned credit card terminals.

Figure 2A:
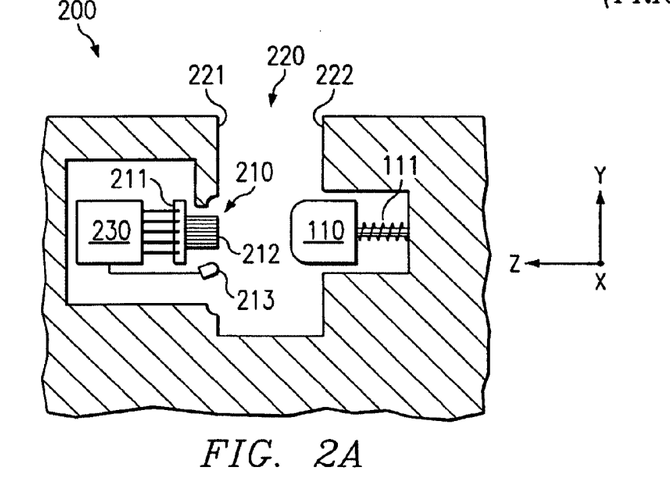
FIG. 2A shows a cross section view of a scanner slot adapted according to a preferred embodiment of the present invention.

Directing attention to FIG. 2A, a portion of a device with a slot or channel having a magnetic read head disposed therein and adapted according to a preferred embodiment of the present invention is shown generally as POS scanner 200. Specifically, POS scanner 200 includes slot 220, defined at least in part by walls 221 and 222, having magnetic read head 110 and optical sensor 210 disposed therein.

Magnetic read head 110 is preferably oriented in wall 222 to interface with a magnetic stripe of a credit or debit card drawn through slot 220. Magnetic read head 110 is preferably coupled to a processor based system which would utilize information read from the magnetic stripe of the credit or debit card to conduct a transaction, such as to initiate an electronic funds transfer of a sales amount.

Figure 2B:
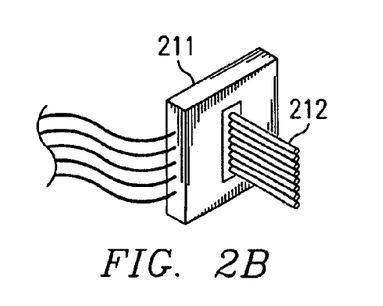
FIG. 2B shows detail with respect to a preferred embodiment of an optical sensor of the scanner slot of FIG. 2A.

Optical sensor 210 is preferably oriented in wall 221 to interface with a MICR code line of a check drawn through slot 220. For example, optical sensor 210 may include photo diode array 211 and light emitting diode (LED) 213 configured to allow photo diode array 211 to receive light emitted from LED 213 as reflected off of check media drawn through slot 220. Light guides 212 may be provided to establish a scanning resolution provided by photo diode array 211 and/or to accommodate physical attributes of the components of optical sensor 210. For example, light guides 212 may comprise a plurality of optic fibers disposed in a predetermined configuration, such as a vertical line or a matrix, and coupled to corresponding photo diodes of the photo diode array to configure the photo diode array for viewing a particular area with a desired level of resolution. Similarly, light guides 212 may be utilized to facilitate disposing photo diode array 211 a distance from a point at which information is scanned without allowing ambient light to be introduced in the scanned light in the path between the photo diode array and the point of scanning. A more detailed view of a preferred embodiment of light guides 212 is shown in FIG. 2B.

Photo diode array 211 may include any number of photo diodes determined to provide a desired resolution of scanning. A preferred embodiment used in scanning MICR codes upon check media utilizes a photo diode array comprising approximately 102 photo diodes in a linear configuration to image an approximately 1 inch band of check media. This preferred embodiment configuration accommodates up and down shifting of the check media during a scan, i.e., scan feed jitter or movement along the Y axis, to capture the entire MICR code line.

Optical scanning according to preferred embodiments of the present invention is adapted to accommodate uncontrolled scan velocities, preferably using compensation techniques as are discussed in further detail herein. Accordingly, photo diode array 211 is preferably coupled to a processor based system, such as processor system 230, which accepts information as detected by photo diode array 211 and which preferably applies a compensation technique or techniques of the present invention to remediate the effects of scan distortion. Processor system 230 preferably includes a central processing unit, such as a microprocessor from the INTEL PENTIUM family of processors or the MOTOROLA POWERPC family of processors, and memory, such as random access memory (RAM), read only memory (ROM), and/or disk or other bulk memory. Compensation algorithms of the present invention may be stored in such memory and the microprocessor may operate under control thereof to remediate the effects of distortion associated with scanning for an accurate and reliable determination of the information scanned.

It should be appreciated that processor system 230 need not be dedicated for use according to the present invention. Accordingly, processor system 230 may additionally be coupled to magnetic read head 110 to provide reading of magnetic stripes in conducting transactions etcetera. For example, where POS terminal circuitry configured for use in magnetic stripe reading provides sufficient processing power and memory to accommodate compensation techniques of the present invention, optical sensor 210 may be coupled thereto to provide an embodiment of the present invention.

It should be appreciated that magnetic read head 110 may be leveraged for use in optical scanning according to the present invention. Specifically, magnetic read head 110 of the illustrated embodiment includes bias spring 111 for providing a bias force to keep magnetic read head 110 in contact with a magnetic stripe during reading. By disposing optical sensor 210 in juxtaposition with magnetic read head 110 according to the illustrated embodiment, the bias force of bias spring 111 may be utilized to hold scanned media near optical sensor 210, i.e., minimize scan feed yaw or movement in along the Z axis.

Preferably, a magnetic read head utilized according to the present invention is disposed to provide a bias pressure with respect to a scanned check without resulting in a friction likely to tear the check media. For example, as magnetic read head 110 of a preferred embodiment is spring loaded, the further the magnetic read head is pressed into its recess in wall 222 of slot 220, the more bias resistance spring 111 is likely to provide. Accordingly, magnetic read head 110 is preferably disposed to provide a sufficient pressure against a credit or debit card to reliably and accurately read a magnetic stripe thereon as well as to allow passing of a check media without causing binding or tearing of the media. With credit or debit card media typically being considerably thicker than check media, proper configuration of a magnetic read head to provide media biasing primarily involves selecting a bias spring providing desired bias characteristics as well as selecting a proper amount of travel with respect to the magnetic read head.

Other techniques may be utilized in biasing media to be scanned toward optical sensor 210. For example, directing attention to FIG. 2C wherein a plan view from the top of POS scanner 200 is shown, member 240 may be provided in slot 220, in addition to or in the alternative to utilizing the bias of magnetic read head 111, to encourage scanned media toward optical sensor 210.

Figures 2C, 3A, 4, 5A:
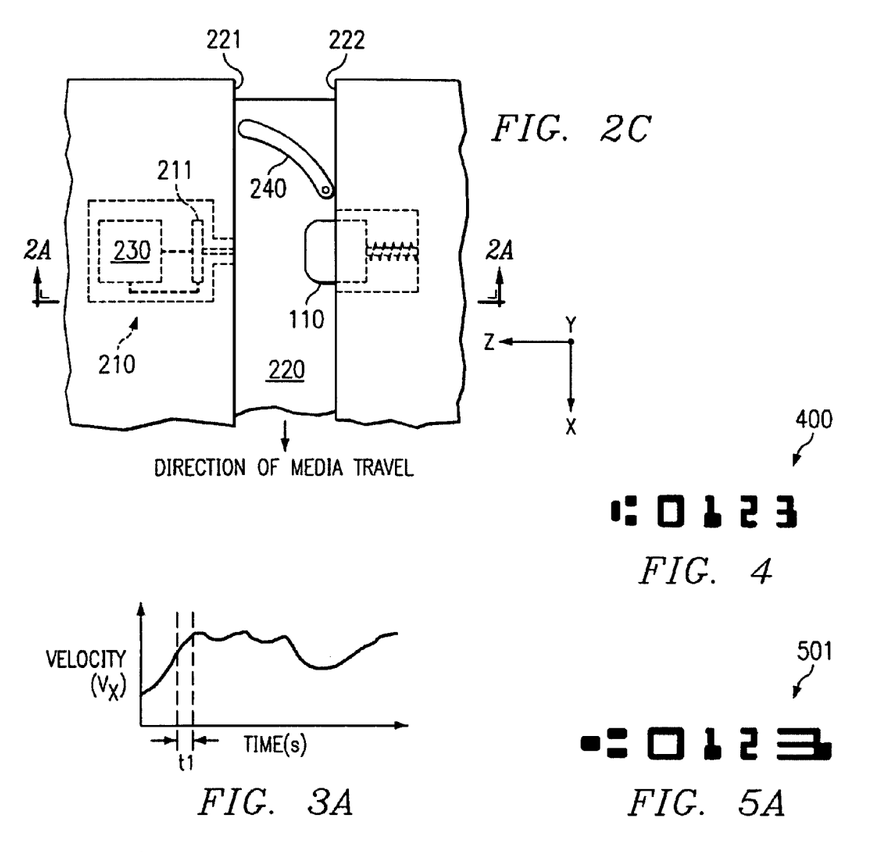
FIG. 2C shows a plan view of a preferred embodiment of the scanner slot of FIG. 2A.
FIGS. 3A–3C show graphs representing changes in velocity along the X, Y, and Z scan axes, respectively, over time.
FIG. 4 shows information which may be scanned according to preferred embodiments of the present invention.
FIGS. 5A–5C show scanned images of the information of FIG. 4 having the effects of distortion associated with changes in velocity along the X, Y, and/or Z scan axes.

It should be appreciated that member 240 may provide functionality in addition to or in the alternative to the aforementioned bias force. For example, member 240, or some portion thereof, may be comprised of rubber, or other material providing a suitable coefficient of friction, and configured to impart a variable resistance upon a media drawn through slot 220. Accordingly, as a media is drawn through slot 220 at a slow velocity, member 240 may impart little or no resistance to the movement of the media through slot 220. However, as the velocity of movement of the media through slot 220 is increased, member 240 may impart increased resistance to thereby dampen distortion associated with uncontrolled scan velocities.

Embodiments of the present invention may utilize techniques in addition to or in the alternative to member 240 providing resistance to dampen distortion associated with uncontrolled scan velocities. For example, a wheel, similar to that of FIGS. 6A and 6B discussed below, may be disposed in slot 220 which is coupled to a shaft adapted to provide increased resistance to rotation as the rotation velocity is increased. Such a shaft may, for example, include splines engaged with a viscous substance, such as an oil, to impart resistance with respect to rotational velocity.

In operation according to a preferred embodiment, a user draws a media to be scanned, such as the aforementioned check, through slot 220. However, a variable media velocity is likely to be experienced because the user manually pulling the media through the slot is unlikely to provide a continuous and constant velocity. For example, a check may be drawn through the slot at a variable rate, such as slower as the scan is begun and faster towards the end of the scan, with increases and decreases in velocity therebetween. Accordingly, optical sensor 210 will view different portions of the media for different amounts of time.

Directing attention to FIG. 3A, a graph representing how scan feed rate may vary as a result of a user drawing a media to be scanned through slot 220 is shown. Specifically, time (shown on the horizontal axis of FIG. 3A) verses scan feed velocity V(x) (shown on the vertical axis of FIG. 3A) is shown. As can be seen in the illustrative graph, a substantial amount of change in velocity may be experienced throughout the scan, beginning here with a ramp up in velocity as the scan is begun and fluctuations in the scan velocity throughout the scan.

Figure 3B:
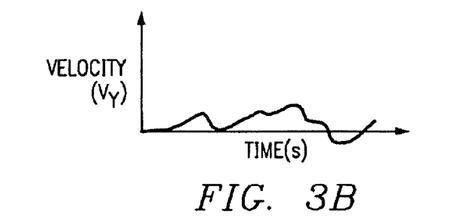

FIG. 3B shows a graph representing scan feed jitter as may result from a user drawing a media to be scanned through slot 220. Specifically, time (shown on the horizontal axis of FIG. 3B) verses scan feed jitter velocity V(y) (shown on the vertical axis of FIG. 3B) is shown. As can be seen in the illustrative graph, a substantial amount of jitter, such as associated with the scanned media bouncing up and down slightly within slot 220, may be experienced throughout the scan.

Figure 3C:
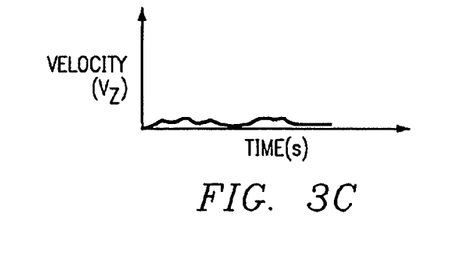

FIG. 3C shows a graph representing scan feed yaw as may result form a user drawing a media to be scanned through slot 220. Specifically, time (shown on the horizontal axis of FIG. 3C) verses scan feed yaw velocity V(z) (shown on the vertical axis of FIG. 3C) is shown. As can be seen in the illustrative graph, a substantial amount of yaw, such as associated with the scanned media drifting closer to and away from optical sensor 210 within slot 220, may be experienced throughout the scan.

Referring now to FIG. 4, an example of information as appearing on a media to be scanned is shown. The example of FIG. 4 shows MICR code 400 including a control symbol, such as the "on-us" MICR symbol, and several MICR characters, here 0, 1, 2, and 3. A typical constant velocity scan would likely produce a digital image of MICR code 400 much as it appears in FIG. 4, i.e., no distortion or consistent distortion throughout the scanned image. For example, typical a POS check reader having a "horseshoe" or U shaped check feed slot, with a knurled rubber roller connected to a motor disposed therein, would feed the media having MICR code 400 thereon past a scanning sensor within the U shaped slot. As a check is inserted into the feed slot, the roller, rotating at a controlled velocity associated with the operation of the motor, engages the check and feeds the check across the sensor at a constant velocity. As the scan velocity is known, the image provided by the sensor may easily be filtered to remove any distortion associated with the scanning.

Alternatively, as the distortion is constant in a system providing a controlled scan velocity and, therefore, known, further processing of the scanned image may be adapted to accommodate the known distortion. For example, a template based pattern recognition algorithm may be adapted to include the expected distortion. Accordingly, known patterns may be compared to, e.g., overlaid on portions of a scanned image and a determination made as to the confidence level of a match. Matches may be determined based upon a number of matching and/or non-matching pixels. Such a technique, however, is not well suited for providing accurate results with respect to scanned information for which scan velocity is not controlled.

The use of such a controlled feed mechanism, although providing simplified and predictable scanned images, has been found not to be conducive either to a relatively small implementation or to providing a relatively inexpensive unit which may economically be deployed in large numbers. Accordingly, preferred embodiments of the present invention provide for scanning of information with uncontrolled scan velocities.

In a system in which controlled scan velocity is not provided, unpredictable distortion may be introduced into the scanned image, making it difficult to further process the scanned information, such as to provide symbol recognition.

For example, scanned image 501 of FIG. 5A represents a digital image which might result from scanning a media having MICR code 400 thereon using POS scanner 200 of FIG. 2A with substantially uncontrolled scan feed rate velocity (movement along the X axis) as represented by V(x) of FIG. 3A. Specifically, as a user of POS scanner 200 draws the media including MICR code 400 through slot 220 past optical sensor 210, the rate at which MICR code 400 passes optical sensor 210 may vary and, correspondingly, portions of scanned image 501 may be stretched or compressed as illustrated.

It should be appreciated that unpredictable distortion introduced along a single axis, as illustrated in scanned image 501, presents a scanned image which may be difficult to use in further processing of the scanned information. For example, automated recognition of the symbols or characters within scanned image 501 may be impossible or unreliable. Accordingly, preferred embodiments of the present invention are adapted to compensate for distortion associated with an uncontrolled scan feed rate.

For example, aforementioned member 240 may be utilized to minimize scan velocity distortion. Using member 240 to engage a surface of a media to be scanned and providing a suitable coefficient of friction, as the media is drawn through slot 220 at a slow velocity, member 240 may impart little or no resistance to the movement of the media through slot 220. However, as the velocity of movement of the media through slot 220 is increased, member 240 may impart increased resistance to thereby dampen distortion associated with uncontrolled scan velocities.

Figure 6A:
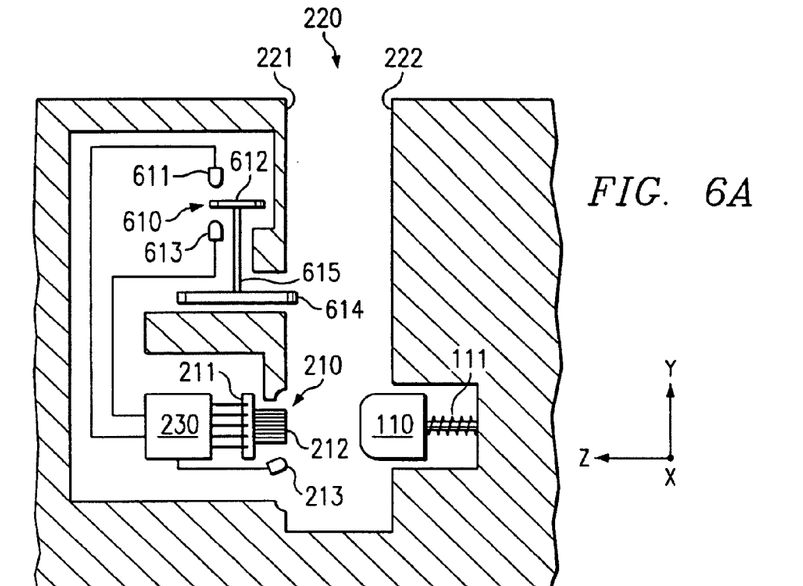
FIG. 6A shows a cross section view of a scanner slot adapted according to an alternative embodiment of the present invention.
Figure 6B:
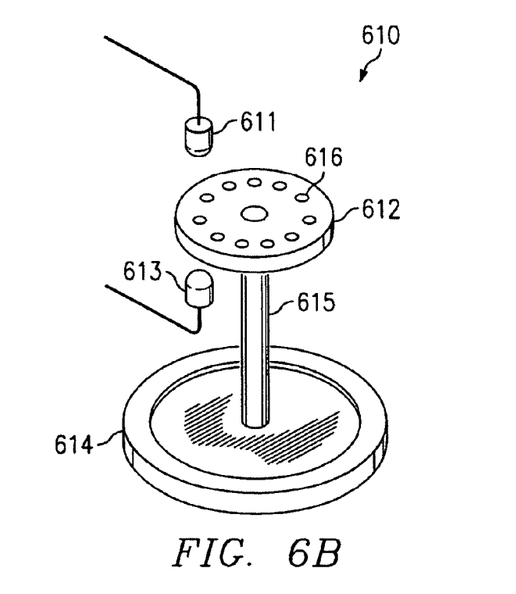
FIG. 6B shows detail with respect to a preferred embodiment of a wheel encoder of the scanner slot of FIG. 6A.

Additionally or alternatively, according to one embodiment of the present invention, wheel encoder 610, as shown in FIG. 6A, may be used to generate a scan velocity synchronizing signal. Specifically, media wheel 614, preferably including a knurled rubber or other surface providing suitable surface friction to engage a surface of a media to be scanned without substantial slippage, may be disposed to engage the media to be scanned as that media is moved with respect to a scanning sensor. Here, in order to provide information with respect to the scan feed rate velocity (V(x)), media wheel 614 is disposed in slot 220 to rotate about axle 615 oriented along the Y axis. As media is drawn through slot 220, media wheel 614 preferably interfaces with a surface thereof and rotates at a velocity corresponding to the scan feed rate velocity of the media. Axle 615 transfers the rotational velocity of media wheel 614 to encoder wheel 612. Accordingly, encoder wheel 612 rotates at a velocity as a function of the scan feed rate velocity of the media. LED 613 emits light which is received by photo diode 611. Timing slots 616 (shown in FIG. 6B) in encoder wheel 612 cause the light of LED 613 as received by photo diode 611 to pulse as a function of the scan velocity of the media. Preferably photo diode 611 is coupled to a processor based system, such as processor system 230, to utilize the timing information acquired from photo diode 611 in normalizing information scanned by optical sensor 210.

It should be appreciated that media wheel 614 may be additionally adapted to provide dampening of uncontrolled velocity, if desired. For example, shaft 615 may be adapted to provide increased resistance to rotation as the rotational velocity is increased, as discussed above.

Preferred embodiments of the present invention implement a distortion compensation technique referred to herein as topology detection. Topology detection utilizes characteristics which are known about the information to be scanned in order to filter the effects of distortion and normalize the scanned information. For example, in scanned image 501 it may be known that characters or symbols are to be scanned which are separated by some amount of open space. Accordingly, even where the particular characters or symbols scanned cannot be recognized, the open spaces therebetween may be identified. Information with respect to these identifiable characteristics of the scanned image may be utilized to normalize the scanned image or portions thereof.

For example, it may be known that spaces should be of a particular length and, thus, information with respect to the length of a space within a scanned image may be utilized to normalize information adjacent to the measured space. Likewise, it may be known that a space should be present between all symbols or characters in an information stream and that the distance between such spaces should correspond to a character or symbol width. Accordingly, the appearance of spaces in a scanned image may be analyzed in providing distortion corrective normalization of scanned information.

It should be appreciated that topology detection according to the present invention is not limited to the use of spaces and/or distances associated therewith. Most any kind of marker for which known relationships exist may be utilized according to the present invention. For example, angle information between markers, such as an angle between an originating point on a line and another position on the line, may be utilized in identifying a known aspect of the scanned information and, thus, used in normalizing scanned information.

Having identified markers in the scanned information, normalization may be applied to the scanned information, or a portion thereof, according to the present invention. According to a preferred embodiment of the present invention markers, such as the aforementioned spaces, are utilized to identify portions of the scanned information for which normalization is to be applied. Directing attention again to FIG. 3A, it can readily be seen that over the span of time for which scanning is conducted (e.g., 4 seconds) a wide span of velocity change may be experienced, making it impractical to homogeneously normalize the scanned image. However, the preferred embodiment markers provide demarcation of small time-wise portions of the scanned image. For example, time span t1 may correspond to the time between detection of markers of the scanned image (e.g., 10 milliseconds). This time t1 may be much smaller than the total scan time. Over such a small time span the scan velocity generally will not change drastically and, therefore, it may be reasonably accurately assumed that a constant scan velocity existed throughout that small time span. Even if the scan velocity were to change very sharply in the identified small time span, the effects would typically be very small as compared to the effects associated with such velocity changes over the entire scan time.

Assuming a constant velocity during a time span between identified markers, preferred embodiments of the present invention operate to homogeneously normalize the portion of the scanned information associated with these markers. Accordingly, scanned information which corresponds to an area between such markers may be stretched or compressed to normalize the information in accordance with the results of analysis of the markers.

Preferred embodiments of the present invention implement the above described topology detection as an instruction set operable upon a processor based system. For example, processor system 230 may have an algorithm stored therein defining operation as set forth above. Accordingly, a scanned image provided by optical sensor 210 to processor system 230 may be normalized by operation of a topology detection algorithm of the present invention operable upon a processor of processor system 230.

Having normalized scanned information by any of the techniques described above, further processing of the scanned image may be provided, such as to process the scanned image to determine the particular characters and/or symbols contained therein. For example, where distortion is substantially present along only one axis, known patterns may be compared to portions of the normalized scanned image and a determination made as to the confidence level of a match.

It should be appreciated, however, that distortion associated with movement along multiple axes may be introduced into a scanned image. Accordingly, one or more of the above described techniques adapted to correct distortion in a scanned image associated with an uncontrolled velocity along a single axis may be used in combination with techniques adapted to correct a scanned image associated with an uncontrolled velocity along another axis. For example, media drawn through slot 220 may bounce or otherwise move vertically (along the Y axis) during the scan, adding to the difficulties in further processing the scanned information.

Figure 5B:
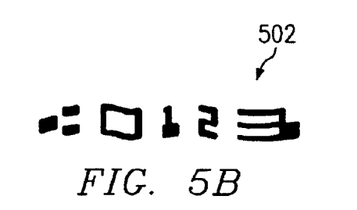

For example, scanned image 502 of FIG. 5B represents a digital image which might result from scanning a media having MICR code 400 thereon using POS scanner 200 of FIG. 2A with substantially uncontrolled scan feed rate velocity (movement along the X axis) as represented by $V(x)$ of FIG. 3A and substantially uncontrolled scan feed rate jitter (movement along the Y axis) as represented by $V(y)$ of FIG. 3B. Specifically, in addition to the changes in scan velocity discussed above with respect to FIG. 5A, as a user of POS scanner 200 draws the media including MICR code 400 through slot 220 past optical sensor 210, the media may not rest uniformly on the floor of the slot, perhaps raising off of the floor at one instant, returning to the floor, and even partially folding to result in negative Y movement. Correspondingly, portions of scanned image 502 may be distorted vertically as illustrated.

Figure 5C:
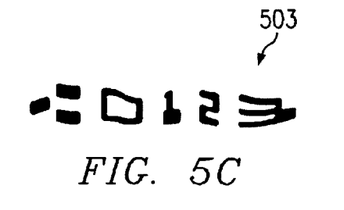

Scanned image 503 of FIG. 5C represents a digital image which might result from scanning a media having MICR code 400 thereon using POS scanner 200 of FIG. 2A with substantially uncontrolled scan feed rate velocity (movement along the X axis) as represented by $V(x)$ of FIG. 3A, substantially uncontrolled scan feed jitter (movement along the Y axis) as represented by $V(y)$ of FIG. 3B, and substantially uncontrolled scan feed yaw (movement along the Z axis) as represented by $V(z)$. In addition to the changes in scan velocity and scan jitter discussed above with respect to FIG. 5B, as a user of POS scanner 200 draws the media including MICR code 400 through slot 220 past optical sensor 210, the media may not remain a uniform distance from optical sensor 210. Correspondingly, portions of scanned image 503 may include divergence distortion as illustrated.

Preferred embodiments of the present invention utilize vector pattern recognition techniques to compensate for distortion associated with uncontrolled velocities along any of the X axis, Y axis, or Z axis, and combinations thereof. For example, vector pattern recognition techniques of the present invention are particularly useful in filtering jitter associated with movement along the Y axis. Accordingly, even where distortion associated with uncontrolled velocity along the X axis has been normalized as discussed above, vector pattern recognition techniques may be utilized to remediate vertical distortion.

Although vector based pattern recognition techniques of the present invention may be used with other normalization techniques, such as the above mentioned topology detection techniques, it should be appreciated that vector based pattern recognition may be utilized independently, even where distortion associated with movement along multiple axes is present. Specifically, it is not necessary to normalize the scanned image data when a preferred embodiment vector based pattern recognition is used as the vectors themselves may be normalized using known topology information with respect to the scanned information. According to a preferred embodiment, a vector based pattern recognition algorithm analyzes relationships between vectors and compares these relationships to a known topology to make determinations with respect to the scanned information.

Vector based pattern recognition algorithms of a preferred embodiment of the present invention operate to analyze a scanned image and convert the information therein to vectors. For example, pixels of the scanned image may be analyzed to recognize connected pixels and assign a vector representation thereto. Accordingly, a continuous string of connected pixels having similar attributes, such as being of a same color, which form a substantially straight line may be represented as a vector having a particular direction. Such vectors may represent both character or symbol data and blank space data.

Figure 7A:
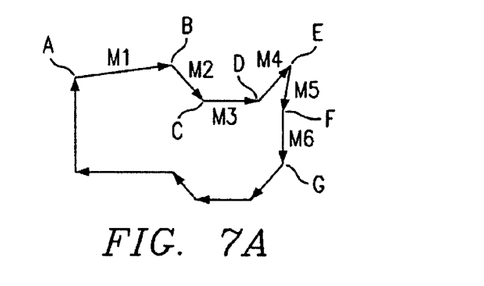
FIG. 7A shows an unfiltered vector representation of a scanned character.

Directing attention to FIG. 7A, a vector representation of a portion of a scanned image as may be provided according to a preferred embodiment vector pattern recognition algorithm is shown. Specifically, FIG. 7A shows a vector representation of the MICR character 0 from scanned image 502 of FIG. 5B. It should be appreciated that in this initial vector representation, aspects of the MICR character 0 are represented as a number of vectors having different slopes. For example, the upper surface of the character includes a plurality of vectors which do not represent the actual character surface particularly well due to the effects of distortion in the scanned image. Accordingly, character recognition techniques, such as the aforementioned template comparison technique, are unlikely to accurately and reliably recognize the character scanned.

Preferred embodiments of the present invention analyzes the slopes of adjacent vectors to determine if these vectors may be represented as a combined vector. For example, vector M1 connects points A and B of the upper portion of the character in FIG. 7A while vector M2 connects points B and C of the upper portion. A slope may be computed with respect to vector M1 and, likewise, a slope may be computed with respect to vector M2. If the slope of M1 and M2 are within a predetermined threshold of one another, it may be assumed that they are representative of single vector having the effects of distortion introduced therein. Accordingly, midpoint B may be dropped and vectors M1 and M2 combined into a single vector between points A and C (referred to as M2' herein, although not shown in the figure).

The above described vector analysis may be repeated with respect to the remaining vectors. For example, a next pair of adjacent vectors, e.g., M3 and M4 connecting points C, D, and E respectively, may be compared and combined as discussed above with respect to vectors M1 and M2. According to a preferred embodiment, vectors may be analyzed in a cascade fashion. For example, the slope of the newly created vector M2' (the vector connecting points A and C) may be computed and, likewise, the slope with respect to vector M3 may be computed. If the slope of M2' and M3 are within a predetermined threshold of one another, it may further be assumed that they are representative of a single vector having the effects of distortion introduced therein. Accordingly, midpoint C may be dropped and vectors M2' and M3 combined into a single vector between points A and D (referred to as M3' herein, although not shown in the figure).

Figure 8:
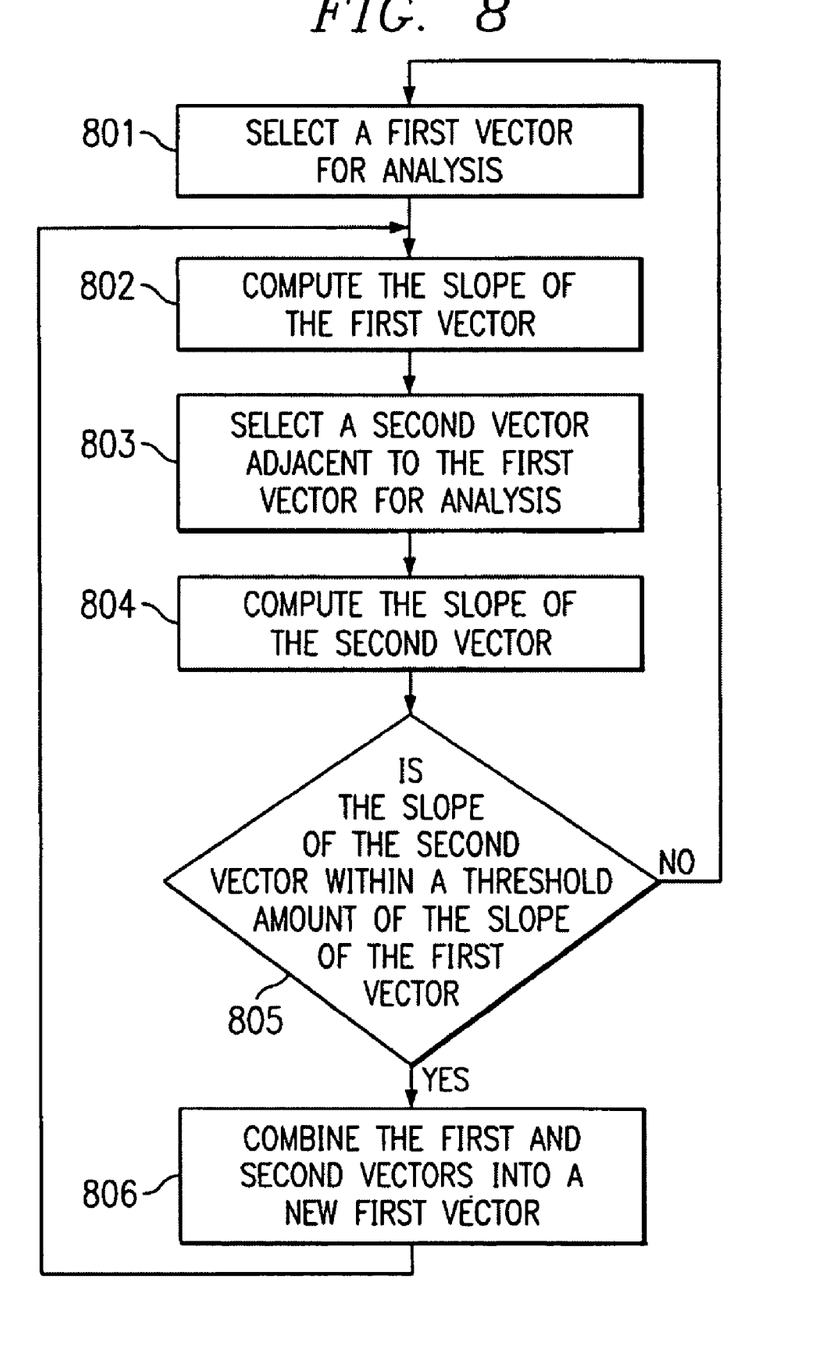
FIG. 8 shows a preferred embodiment flow diagram of vector analysis according to a preferred embodiment of the present invention.

A preferred embodiment flow diagram implementing the above steps is shown in FIG. 8. Specifically, at step 801 a first vector for analysis, such as vector M1, is selected. At step 802 a slope of the first vector is computed. At step 803 a second vector for analysis adjacent to the first vector, such as vector M2, is selected. At step 804 a slope of the second vector is computed. At step 805 a determination is made as to whether the slope of the first vector and the second vector are within a threshold amount of one another. If the slopes are within the threshold amount of one another, the first and second vectors are combined into a single vector, such as vectors M1 and M2 being combined into new vector M2', and the new vector is identified as the first vector for further processing. Accordingly, processing returns to step 802.

However, if the slopes of the first and second vectors are not within the threshold amount of one another, it is concluded that the first and second vectors should not be combined and processing returns to step 801 for selection of a new first vector. Preferably, the new first vector selected is the previously selected second vector in order to determine if any adjacent vectors should be combined with this vector.

Figure 7B:
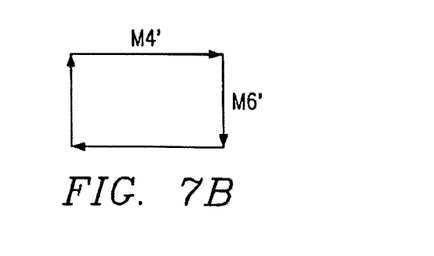
FIG. 7B shows a vector representation of a scanned character filtered according to a preferred embodiment of the present invention.

For example, a first iteration of the above steps may select vector M1 of FIG. 7A as a first vector for analysis and adjacent vector M2 of FIG. 7A as a second vector for analysis. The first iteration of the above steps may operate to combine vectors M1 and M2 into vector M2' (not shown). A second iteration of the above steps may combine vectors M2' and M3 into vector M3' (not shown). A third iteration of the above steps may combine vectors M3' and M4 into vector M4' (shown in FIG. 7B). However, a fourth iteration of the above steps may determine that vectors M4' and M5 have sufficiently different slopes such that these vectors should not be combined. Therefore, a fifth iteration of the above steps may select vector M5 as a first vector for analysis and adjacent vector M6 as a second vector for analysis. The fifth iteration of the above steps may operate to combine vectors M5 and M6 into vector M6' (shown in FIG. 7B).

The steps of the preferred embodiment method may be repeated until a vector representation of the character is provided substantially without the effects of distortion. For example, the vectors of FIG. 7A may be combined into the filtered vectors of FIG. 7B, which more closely represent the scanned MICR character "0" than do the unfiltered vectors of FIG. 7A.

It should be appreciated that the above described preferred embodiment steps may be continued until all vectors have been analyzed or may be repeated, analyzing vectors remaining after application of the preferred embodiment method, until a desired level of filtering has been provided. Moreover, depending upon the attributes of the symbols or characters scanned, subsequent passes of the steps may be altered, such as to utilize a different threshold value for comparison of slopes, if desired. For example, the steps may be performed such that multiple passes have been made with respect to the vectors of a particular character to thereby ensure that all vectors having suitably similar slopes are fully combined. Preferred embodiments of the present invention operate to conduct two complete passes with respect to the vectors of a scanned MICR symbol or character using a slope threshold of approximately 15 to 20 degrees.

Preferred embodiments of the present invention implement the above described vector pattern recognition as an instruction set operable upon a processor based system. For example, processor system 230 may have an algorithm stored therein defining operation as set forth above. Accordingly, a scanned image provided by optical sensor 210 to processor system 230 may be normalized by operation of a vector pattern recognition algorithm of the present invention operable upon a processor of processor system 230.

It should be appreciated that the above described preferred embodiment vector analysis provides correction not only for distortion associated with scan feed jitter (e.g., uncontrolled movement of the scanned media along the Y axis), but also provides correction for distortion associated with scan feed yaw (e.g., uncontrolled movement of the scanned media along the Z axis). Accordingly, preferred embodiment vector based pattern recognition algorithms may be utilized to provide correction with respect to both Y axis distortion and Z axis distortion.

Filtered vectors provided according to vector based pattern recognition techniques of the present invention may be utilized in filtering distortion associated with uncontrolled scan feed rate velocity (e.g., uncontrolled movement of the scanned media along the X axis). Accordingly, a preferred embodiment of a vector based pattern recognition algorithm of the present invention utilizes vector direction information, e.g., the direction of particular vectors in relation to other vectors present in the scanned character or symbol, in determining the character or symbol represented. For example, from the four vector relationship in the filtered vector representation of FIG. 7B, wherein two horizontal vectors and two vertical vectors are disposed substantially beginning to end with respect to one another, it can be determined with a high degree of confidence that the MICR symbol "0" is represented. This determination may be made without regard to the magnitude of the particular vectors and, therefore, may forego normalizing X axis distortion. Of course, normalization, such as provided by the techniques described above, may be utilized in combination with vector based pattern recognition techniques of the present invention.

As described above, preferred embodiments of the present invention provide compensation for distortion in scanned characters and symbols resulting from uncontrolled velocity scanning. Preferred embodiments of the invention further implement techniques to ensure that information is not lost due to extreme situations with respect to uncontrolled velocity scanning. Specifically, embodiments of the present invention will accept for analysis scanned images which are provided a scan velocity sufficiently fast that substantial information is not missing from the scanned image and/or which are provided a scan velocity sufficiently slow that substantial information is not missing from the scanned image.

Accordingly, a preferred embodiment of the present invention establishes a window in which a scanned image is to be acquired once a scan is begun in order to assure substantially complete information is present in the scanned image. For example, it may be known that a media to be scanned, e.g., a check, is approximately 5 inches in length. It may be further determined that due to memory and processing constraints, such as may be implemented to provide a relatively simple and portable scanning device, a particular scanner operative according to the present invention is configured to sense approximately 20 lines per millisecond. Accordingly, a window may be established in which a scan must be completed within approximately ¾ second to approximately 1½ seconds or the scanned image will be rejected for analysis according to a preferred embodiment of the present invention.

Preferably, positive and/or negative feedback is implemented to notify a user of a scan meeting the above criteria. For example, an audible tone may sound to indicate a scan providing an acceptable scanned image. Correspondingly, a different audible tone may sound to indicate a scan providing an unacceptable scanned image. Additionally or alternatively, a visual indication, such as a message appearing on a scanner device display, may be provided to a user to indicate an acceptable and/or unacceptable scanned image.

The timing of a scan window according to embodiments of the present invention may be established as from a time at which a media is first detected passing a scanning sensor to a time at which the media is detected clearing the scanning sensor. Alternatively, timing of a scan window according to embodiments of the present invention may be established as from a time at which an area of interest, e.g., a MICR code to be scanned, is first detected passing a scanning sensor to a time at which the area of interest is detected clearing the scanning sensor. For example, according to a preferred embodiment, the timing of a scan window is not begun until the first black symbols or characters of a code to be scanned are detected. Accordingly, scan velocities of media portions proceeding this first symbol or character are not determinative of an acceptable scanned image.

It should be appreciated that, although a preferred embodiment of the present invention has been described herein with reference to a scanner device adapted to provide both optical and magnetic scanning, there is no limitation to the use of the present invention in such dual use devices. Accordingly, an embodiment of the present invention may be provided without a magnetic read head, if desired. Similarly, there is no requirement that the present invention be implemented with respect to a photo diode optical sensor. For example, a capacitive coupled device (CCD) may be utilized as a scanning sensor for providing scanned images to be filtered according to the present invention.

Preferred embodiments have been described herein with reference to uncontrolled movement resulting in distorted scanned images. It should be appreciated that such uncontrolled movement may include movement of a scanned media with respect to a sensor, movement of a sensor with respect to a scanned media, and combinations thereof.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of compensating for distortion in a scanned image, said method comprising:

representing at least a portion of said scanned image using vectors;

analyzing said vectors to determine two or more of said vectors which may be combined into a single vector;

acquiring a scan velocity clock signal; and utilizing said scan velocity clock signal to normalize at least a portion of said scanned image.

2. The method of claim 1 wherein said vectors comprise different slopes wherein the different slopes indicate distortion in said scanned image.

3. The method of claim 1 wherein said representing step comprises representing pixels of said scanned image as said vectors, said vectors having different slopes.

4. The method of claim 1 wherein said vectors represent a continuous string of connected pixels having similar attributes.

5. The method of claim 1, further comprising:

providing topology information with respect to information contained in said scanned image.

6. The method of claim 5, further comprising:

referencing said topology information with respect to said vectors after said analyzing is used to combine one or more of said vectors into a single vector to identify a particular symbol represented by said vectors.

7. The method of claim 5, further comprising:

normalizing a magnitude of at least one of said vectors using said topology information.

8. A method of compensating for distortion in a scanned image, said method comprising:

representing at least a portion of said scanned image using vectors;

analyzing said vectors to determine two or more of said vectors which may be combined into a single vector, wherein said analyzing said vectors comprises:

determining a slope of each of said vectors;

comparing the slopes of adjacent ones of said vectors to determine if the slopes are within a threshold amount of one another; and combining adjacent vectors having slopes within said threshold amount of one another.

9. A method of compensating for distortion in a scanned image, said method comprising:

representing at least a portion of said scanned image using vectors;

analyzing said vectors to determine two or more of said vectors which may be combined into a single vector; and analyzing relationships between said vectors after said combining adjacent vectors to identify symbols present in said scanned image, wherein said vector relationships are analyzed without regard to magnitudes of said vectors.

10. A method of compensating for distortion in a scanned image, said method comprising:

representing at least a portion of said scanned image using vectors;

analyzing said vectors to determine two or more of said vectors which may be combined into a single vector;

acquiring timing information with respect to said scanned image; and normalizing a magnitude of at least one of said vectors using said timing information.

11. The method of claim 10, wherein said timing information is acquired at least in part through the use of an encoder wheel system.

12. A method of compensating for distortion in a scanned image said method comprising:

representing at least a portion of said scanned image using vectors;

analyzing said vectors to determine two or more of said vectors which may be combined into a single vector; and applying variable resistance to a media being scanned to thereby dampen an uncontrolled scan rate velocity.

13. The method of claim 12, wherein said variable resistance is provided through the use of a member disposed to engage said media.

14. The method of claim 12, wherein said variable resistance is provided through the use of a wheel disposed to engage said media.

15. A method of compensating for distortion in a scanned image, said method comprising:

representing at least a portion of said scanned image using vectors;

analyzing said vectors to determine two or more of said vectors which may be combined into a single vector; and applying a bias force against a surface of a media being scanned to thereby dampen uncontrolled scan yaw velocity.

16. A system for scanning information, said system comprising:

an optical sensor; and a processor coupled to said optical sensor and operable to receive an image scanned by said optical sensor with substantially uncontrolled scan velocity, wherein said processor operates under control of an instruction set operable to filter said scanned image of effects of said uncontrolled scan velocity, wherein said instruction set controls operation of said processor to represent at least a portion of said scanned image as a plurality of vectors for use in filtering said scanned image of effects of said uncontrolled scan velocity, wherein said instruction set compensates for distortion of said image in two dimensions.

17. The system of claim 16 wherein said instruction set filters effects of uncontrolled scan velocity by filtering distortion associated with uncontrolled movement along an X axis, a Y axis, and a Z axis.

18. The system of claim 16, wherein said optical sensor comprises:

a photo diode array; and a light emitter.

19. The system of claim 18, wherein said photo diode array comprises a linear configuration of photo diodes.

20. The system of claim 19, wherein said linear configuration of photo diodes comprises at least 100 diodes.

21. The system of claim 18, wherein said photo diode array comprises a matrix configuration of photo diodes.

22. The system of claim 18, wherein said optical sensor further comprises:

an array of light guides corresponding to said array of photo diodes.

23. The system of claim 16, further comprising:

memory storing topology information with respect to information appearing in said scanned image.

24. The system of claim 23, wherein said instruction set controls operation of said processor to identify markers in said scanned image, identify a plurality of portions of said scanned image for filtering, and filter said plurality of portions of said scanned image utilizing said identified markers and said topology information.

25. The system of claim 24, wherein a first portion of said plurality of portions is filtered using a first homogeneous normalizing function throughout and wherein a second portion of said plurality of portions is filtered using a second homogeneous normalizing function throughout.

26. The system of claim 16, wherein said vector representation represents pixels of said scanned image as vectors having different slopes.

27. The method of claim 16, wherein said vectors represent a continuous string of connected pixels having similar attributes.

28. The system of claim 16 wherein said instruction set controls operation of said processor to filter said scanned image by analyzing said vectors to determine one or more of said vectors which may be combined into a single vector.

29. The system of claim 28, wherein said instruction set controls operation of said processor to analyze said vectors by determining a slope of each of said vectors; comparing the slopes of adjacent ones of said vectors to determine if the slopes are within a threshold amount of one another, and combining adjacent vectors having slopes within said threshold amount of one another.

30. The system of claim 16, further comprising:
   a scan rate sensor providing timing information with respect to a scan rate of said scanned image to said processor, wherein said instruction set controls operation of said processor to filter said scanned image as a function of said timing information.

31. The system of claim 30, wherein said scan rate sensor comprises:
   a wheel encoder adapted to engage a surface of a media to be scanned, wherein said wheel encoder provides timing pulses to said processor as a function of a velocity of said surface of said media.

32. A method of performing optical character recognition on a financial instrument that identifies an account number, comprising:
   scanning said financial instrument to generate an image of at least a portion of said financial instrument, wherein said scanning is performed using an uncontrolled velocity;
   detecting continuous strings of connected pixels having similar attributes within said image;
   representing said continuous strings of pixels as vectors in a two-dimensional plane;
   combining subsets of said vectors having similar characteristics; and
   determining said account number using said vectors after said combining is performed.

33. The method of claim 32 wherein said combining combines adjacent vectors having slopes within a threshold amount.

34. The method of claim 32 further comprising normalizing said vectors.

35. The method of claim 34 wherein said normalizing is performed using velocity information obtained from a mechanical element that is manipulated while said scanning is performed.

36. The method of claim 34 wherein said normalizing is performed using separation distances between symbols associated with said account number.

37. The method of claim 32 wherein said combining is performed in an iterative manner.

* * * * *